United States Patent [19]

Nicklin et al.

[11] 3,859,415

[45] Jan. 7, 1975

[54] HYDROGEN CYANIDE REMOVAL

[75] Inventors: Thomas Nicklin, Rochdale; Peter Spence Clough, Manchester, both of England

[73] Assignee: North Western Gas Board, Cheshire, England

[22] Filed: Sept. 15, 1972

[21] Appl. No.: 289,384

[30] Foreign Application Priority Data
Sept. 21, 1971 Great Britain............... 43878/71

[52] U.S. Cl.............................. 423/236, 252/467
[51] Int. Cl............................................. C01c 3/04
[58] Field of Search................... 423/236, 210, 230; 252/467, 470

[56] References Cited
UNITED STATES PATENTS
2,743,153  4/1956  Marsh et al...................... 423/236
3,717,699  2/1973  Nicklin et al..................... 252/467

OTHER PUBLICATIONS

Cotton & Wilkonson, "Advanced Inorganic Chemistry," 2nd Ed. Interscience Publishers, New York, N.Y., 1966; pp. 1078, 1088, 1096.

Primary Examiner—Oscar R. Vertiz
Assistant Examiner—Brian E. Hearn
Attorney, Agent, or Firm—Sughrue, Rothwell, Mion, Zinn & Macpeak

[57] ABSTRACT

Hydrogen cyanide is removed from gas mixtures containing hydrogen cyanide and hydrogen sulphide by treating the gas mixture with a catalyst comprising the elements nickel, uranium and thorium disposed as their oxides on a gamma alumina support. Preferably the gas mixture is saturated with water vapour before being subjected to the catalytic treatment.

3 Claims, No Drawings

HYDROGEN CYANIDE REMOVAL

All gases produced from coal, such as coke oven gas and town's gas, contain some hydrogen cyanide as well as hydrogen sulphide. Where the Stretford Process, which involves washing the gas with an alkaline liquor containing anthraquinene disulphonic acid, is used to treat these gas streams for removal of hydrogen sulphide, unless an adequate means of hydrogen cyanide removal is used prior to the Stretford Process treatment, there is an increased alkali consumption and a subsequent rise in the total dissolved solids including alkali thiocyanates. This leads ultimately to premature rejection of reagent and to difficulties in disposing of the rejected liquor.

A known method of hydrogen cyanide removal is polysulphide washing. This involves washing the gas stream with a solution of ammonium polysulphide, formed by the addition of sulphur cake to a solution of ammonia. Whilst this process has been favoured in the past, it is not usual to obtain removal efficiency in excess of 85%, furthermore the polysulphide washing solution can be worked up to 15% thiocyanate content which is difficult to dispose of.

According to the invention hydrogen cyanide is removed from a gas mixture containing hydrogen cyanide and hydrogen sulphide, by treating the gas mixture with a catalyst comprising the elements nickel, uranium and thorium disposed as their oxides on a gamma alumina support.

Preferably the gas mixture is saturated with water vapour before being subjected to the catalytic treatment.

The technique used in the preparation of such catalysts involves impregnation of the active oxides onto ⅛ inch gamma alumina granules from a solution of the respective nitrates. A catalyst containing by weight 8.4% Ni, 10.7% U, 9.1% Th, the metals being present in the form of their oxides, has been found to give satisfactory results. After impregnation, the catalyst is calcined at a temperature of for example 400° C, this temperature being high enough to cause the decomposition of the nitrates to the oxides but not so high that sintering of these oxides would occur.

This invention is illustrated by the following examples.

EXAMPLE 1

100 ccs of a catalyst prepared as described above were packed into a stainless steel tube, the dimensions of which were 2 feet 6 inches long and 1 inch in diameter. The catalyst bed was arranged to occupy the central portion of the tube, the space at either end being packed with inert gamma alumina granules. The tube was then placed in a furnace and brought up to temperature. Control of the catalyst bed temperature was effected by means of several control thermocouples placed at convenient points. These temperatures were displayed on a recording potentiometer.

A synthetic gas mixture containing hydrogen sulphide, hydrogen cyanide, hydrogen and nitrogen was generated by bubbling a gas mixture containing all the components except hydrogen cyanide through an acid solution into which a standard solution of sodium cyanide was metered. The resulting gas stream was passed through the reactor at a series of space velocities and temperatures as in the following table, yielding the results indicated.

| Space velocity hrs$^{-1}$ | Inlet gas analysis % by volume | | | | Outlet gas analysis % by volume | | | HCN removal %eff | Bed Temp. °C |
|---|---|---|---|---|---|---|---|---|---|
| | N$_2$ | H$_2$ | H$_2$S | HCN | H$_2$S | HCN | CH$_4$ | | |
| 500  | 38.4 | 61.1 | 0.4 | 0.1 | 0.4 | .001 | Trace | 99%   | 200 |
| 500  | 38.4 | 61.1 | 0.4 | 0.1 | 0.4 | .05  | Trace | 50%   | 150 |
| 1000 | 38.4 | 61.0 | 0.4 | 0.2 | 0.4 | .02  | Trace | 90%   | 200 |
| 1500 | 36.4 | 61.0 | 0.4 | 0.2 | 0.4 | .04  | Trace | 80%   | 200 |
| 1500 | 36.4 | 61.0 | 0.4 | 0.2 | 0.4 | .005 | Trace | 98.8% | 250 |

These results indicate that the catalyst composition used is effective in the hydrogenation of hydrogen cyanide particularly so at the higher temperature of 250° C even using space velocities as high as 1,500 hrs $^{-1}$.

EXAMPLE 2

A synthetic gas mixture comprising hydrogen sulphide, hydrogen cyanide, hydrogen and nitrogen was generated by bubbling a gas mixture containing all the components except hydrogen cyanide through an acid solution into which the appropriate volume of a standard solution of sodium cyanide was metered. The resulting gas stream was contacted with water, by bubbling, at a temperature of 60° C, thereby saturating the gas stream with water vapour at that temperature. The gas stream was then passed through a heated reactor tube, containing 100 cc of catalyst at a space velocity of 430 hr $^{-1}$ and a temperature of 150°C. The results obtained were as follows:-

| Space velocity hrs$^{-1}$ | Inlet gas analysis % by volume | | | | Outlet gas analysis % by volume | | | HCN removal %eff | Bed Temp. °C |
|---|---|---|---|---|---|---|---|---|---|
| | N$_2$ | H$_2$ | H$_2$S | HCN | H$_2$S | HCN | CH$_4$ | | |
| 430 | 38.4 | 61.1 | 0.4 | 0.1 | 0.4 | 0.0001 | Trace | 99% | 150 |

Comparison of this result with the result shown in Example 1 where a removal efficiency of 50% only is obtained at a similar space velocity, viz. 500 hr$^{-1}$, and the same catalyst bed temperature illustrates the advantage in the process of saturating the gas stream with water vapour at 60° C prior to admission to the catalytic reactor.

Catalysts as described which are based on gamma alumina can easily be regenerated if they become fouled with carbon. They have a considerable capacity for hydrogen adsorption, which facilitates the destruction of the hydrogen cyanide.

What is claimed is:

1. A method for removing hydrogen cyanide from a gas mixture containing hydrogen, hydrogen cyanide and hydrogen sulphide which process comprises contacting said mixture with a tricomponent catalyst system containing 8.4% nickel, 10.7% uranium and 9.1% thorium disposed as their oxides on a gamma alumina support, at a temperature of from 150° to 250° C.

2. A method as claimed in claim 1, in which the gas mixture is saturated with water vapour before being subjected to the catalytic treatment.

3. A method as claimed in claim 1, in which the catalyst is obtained by impregnating gamma alumina granules with a solution of the nitrates of nickel, uranium and thorium and calcining to cause decomposition of the nitrates to the oxides.

* * * * *